United States Patent
Tilton

(10) Patent No.: US 7,721,209 B2
(45) Date of Patent: May 18, 2010

(54) OBJECT-AWARE TRANSITIONS

(75) Inventor: James Eric Tilton, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/422,808

(22) Filed: Apr. 13, 2009

(65) Prior Publication Data

US 2010/0064223 A1 Mar. 11, 2010

Related U.S. Application Data

(63) Continuation-in-part of application No. 12/206,217, filed on Sep. 8, 2008.

(51) Int. Cl.
*G06F 3/00* (2006.01)
*G06F 3/48* (2006.01)
(52) U.S. Cl. .......... 715/732; 715/730; 715/833
(58) Field of Classification Search ........ 345/619; 715/730, 732
See application file for complete search history.

(56) References Cited

U.S. PATENT DOCUMENTS

| | | |
|---|---|---|
| 5,640,522 A | 6/1997 | Warrin |
| 5,673,401 A | 9/1997 | Volk |
| 5,687,331 A | 11/1997 | Volk |
| 5,717,848 A | 2/1998 | Watanabe |
| 5,917,480 A | 6/1999 | Tafoya |
| 5,933,150 A | 8/1999 | Ngo |
| 6,081,262 A | 6/2000 | Gill |
| 6,091,427 A | 7/2000 | Boezeman et al. |
| 6,111,590 A | 8/2000 | Boezeman et al. |
| 6,252,677 B1 | 6/2001 | Hawes |
| 6,351,265 B1 | 2/2002 | Bulman |
| 6,396,500 B1 * | 5/2002 | Qureshi et al. .......... 345/473 |
| 6,546,397 B1 | 4/2003 | Rempell |
| 6,573,899 B2 * | 6/2003 | Aono .......... 345/473 |
| 6,580,438 B1 | 6/2003 | Ichimura |
| 6,646,655 B1 * | 11/2003 | Brandt et al. .......... 715/723 |
| 6,674,484 B1 | 1/2004 | Boland et al. |
| 6,717,591 B1 | 4/2004 | Fuveash |
| 6,836,870 B2 | 12/2004 | Abrams |
| 6,957,389 B2 | 10/2005 | Faraday |

(Continued)

FOREIGN PATENT DOCUMENTS

WO  WO03052626  6/2003

(Continued)

OTHER PUBLICATIONS

Zongker, Salesin, "On Creating Animated Presentations", Symposium on Computer Animation, 2003.*

(Continued)

*Primary Examiner*—William L Bashore
*Assistant Examiner*—Ece Hur
(74) *Attorney, Agent, or Firm*—Fletcher Yoder PC

(57) ABSTRACT

Techniques for accomplishing slide transitions in a presentation are disclosed. In accordance with these techniques, objects within the slides are identified, automatically or by a user, and each object is individually manipulable during slide transitions. The individual manipulation applied to each object during a transition may also be automatically determined or specified by a user. In certain embodiments, the persistence of an object between slides may be taken into account in the manipulation of the object during slide transition.

18 Claims, 13 Drawing Sheets

U.S. PATENT DOCUMENTS

| | | | |
|---|---|---|---|
| 7,017,115 B2 | 3/2006 | Hayashi | |
| 7,042,464 B1 | 5/2006 | Paquette | |
| 7,084,875 B2 | 8/2006 | Plante | |
| 7,102,643 B2 | 9/2006 | Moore | |
| 7,155,676 B2 | 12/2006 | Land | |
| 7,165,212 B2 | 1/2007 | Faraday | |
| 7,236,632 B2 | 6/2007 | Erol | |
| 7,246,316 B2 | 7/2007 | Furlong | |
| 7,302,113 B2* | 11/2007 | Pilu et al. | 382/276 |
| 7,372,991 B2 | 5/2008 | Chen | |
| 7,383,509 B2 | 6/2008 | Foote | |
| 7,428,704 B2 | 9/2008 | Baker | |
| 7,434,153 B2 | 10/2008 | Liu et al. | |
| 7,443,401 B2 | 10/2008 | Blanco | |
| 7,454,077 B1* | 11/2008 | MacKenzie et al. | 382/250 |
| 7,467,351 B1 | 12/2008 | Spells | |
| 7,496,833 B1 | 2/2009 | Ten Kate et al. | |
| 2002/0191013 A1* | 12/2002 | Abrams | 345/730 |
| 2003/0160814 A1 | 8/2003 | Brown | |
| 2004/0083425 A1* | 4/2004 | Dorwart | 715/502 |
| 2004/0130566 A1 | 7/2004 | Banerjee | |
| 2004/0218894 A1 | 11/2004 | Harville | |
| 2005/0068339 A1* | 3/2005 | Lipsky et al. | 345/661 |
| 2005/0091672 A1 | 4/2005 | Debique | |
| 2005/0154679 A1 | 7/2005 | Bielak | |
| 2005/0188311 A1 | 8/2005 | Diesel | |
| 2005/0251731 A1* | 11/2005 | Valderas et al. | 715/500 |
| 2006/0067578 A1 | 3/2006 | Fuse | |
| 2006/0129933 A1* | 6/2006 | Land et al. | 715/723 |
| 2006/0129934 A1 | 6/2006 | Siebrecht | |
| 2006/0136827 A1 | 6/2006 | Villaron | |
| 2006/0167903 A1 | 7/2006 | Smith | |
| 2006/0197764 A1* | 9/2006 | Yang | 345/473 |
| 2006/0246409 A1 | 11/2006 | Akopian | |
| 2006/0265643 A1 | 11/2006 | Saft | |
| 2006/0265659 A1 | 11/2006 | Collins | |
| 2006/0271871 A1 | 11/2006 | Blaukopf | |
| 2006/0288389 A1* | 12/2006 | Deutscher et al. | 725/88 |
| 2007/0038937 A1 | 2/2007 | Asakawa | |
| 2007/0081197 A1* | 4/2007 | Omoigui | 358/403 |
| 2007/0101251 A1 | 5/2007 | Lee et al. | |
| 2007/0106927 A1 | 5/2007 | Antley | |
| 2007/0162853 A1 | 7/2007 | Weber | |
| 2007/0245243 A1 | 10/2007 | Lanza | |
| 2007/0277106 A1 | 11/2007 | Takriti | |
| 2007/0300158 A1 | 12/2007 | Kasperkiewicz et al. | |
| 2008/0005652 A1 | 1/2008 | Krishnaswamy | |
| 2008/0092050 A1* | 4/2008 | Wu et al. | 715/730 |
| 2008/0120546 A1* | 5/2008 | Pulier | 715/716 |
| 2008/0192056 A1 | 8/2008 | Robertson et al. | |
| 2008/0250321 A1 | 10/2008 | Lee | |
| 2008/0313214 A1 | 12/2008 | Duhig et al. | |
| 2009/0044123 A1 | 2/2009 | Tilton | |
| 2009/0049075 A1 | 2/2009 | Kim et al. | |
| 2009/0060334 A1* | 3/2009 | Rayner | 382/173 |

FOREIGN PATENT DOCUMENTS

| | | |
|---|---|---|
| WO | WO2007091081 | 8/2007 |
| WO | WO2008007905 | 1/2008 |
| WO | WO2008115747 | 9/2008 |

OTHER PUBLICATIONS

U.S. Appl. No. 10/337,767, filed Jan. 6, 2003, James Eric Tilton.

U.S. Appl. No. 12/206,217, filed Sep. 8, 2008, James Eric Tilton.

Gigonzac, G., et al.; "Electronic Slide Matching and Enhancement of a Lecture Video", Visual Media Production, 2007, IETCVMP, 4th European Conference; published Nov. 27-28, 2007.

Liu, Tiecheng, et al.; "Analysis and Enhancement of Videos of Electronic Slide Presentations", Multimedia and Expo, 2002, ICME '02 Proceedings, 2002 IEEE International Conference; published Aug. 26-29, 2002.

Fan, Quanfu, et al.; "Temporal Modeling of Slide Change in Presentation Videos", Acoustics, Speech and Signal Processing, 2007, ICASSP 2007, IEEE International Conference, published Apr. 15-20, 2007.

Kato, Yoshikazu, et al.; "Effect Lines for Specifying Animation Effects", Visual Languages and Human Centric Computing, 2004 IEEE Symposium, published Sep. 30, 2004.

Hunter, J. et al.; "Building and Indexing a Distributed Multimedia Presentation Archive Using SMIL", Research and Advanced Technology for Digital Libraries, 5th European Conference, ECDL 2001, Proceedings (Lecture Notes in Computer Science, vol. 2163), 415-28 2001.

DeLucia, Andrea, et al.; "VLMigrator: A Tool for Migrating Legacy Video Lectures to Multimedia Learning Objects", Software—Practice and Experience, vol. 38, No. 14, Nov. 25, 2008, pp. 1499-1530.

Hua, Xian-Sheng, et al.; "Content Based Photograph Slide Show with Incidental Music", Proceedings of the 2003 IEEE International Symposium on Circuits and Systems (Cat. No. 03CH37430), pp. II-648-651, vol. 2, 2003.

Niblack, Wayne; SlideFinder: A Tool for Browsing Presentation Graphics Using Content-Based Retrieval, Content-Based Access of Image and Video Libraries proceedings, IEEE Workshop, published Jun. 22, 1999.

Author unknown; Utilizing Metadata Contained in Digital Image Files, IBM IP.com Prior Art Database on Sep. 13, 2007 UTC.

Zongker, Douglas E., et al.; "On Creating Animated Presentations", Source Symposium on Computer Animation archive, Proceedings of the 2003 ACM SIGGRAPH, pp. 298-308.

Fujita, H., et al.; "Animation of Mapped Photo Collections for Storytelling", IEICE Transactions for Information and Systems, vol. E91-D, No. 6, pp. 1681-1692, published Jun. 2008.

www.crystalgraphics.com/presentations PowerPlugs: Transitions.

www.crstalgraphics.com/products Transitions—3D Sensations for Presentations.

Ngo, Chong-Wah et al.; "Detection of slide transition for topic indexing," Aug. 2002 IEEE International Conference, vol. 2, pp. 533-536.

Ozawa, Noriaki et al.; "Slide identification for lecture movies by matching characters and images;" Proceedings of SPIE, vol. 5296, p. 74-81, 2004.

Bulterman, Dick C.A.; "Structured multimedia authoring;" ACM and TOMCCAP, vol. 1, Issue 1 (Feb. 2005), pp. 89-109.

Tatsuya, Ishihara et al.; "Analyzing visual layout for a non-visual presentation-document interface;" 8th Intnt'l ACM SIGACCESS conference, (2006), pp. 165-172.

* cited by examiner

OBJECT-AWARE TRANSITIONS

CROSS-REFERENCE TO RELATED APPLICATIONS

This application is a continuation-in-part of U.S. patent application Ser. No. 12/206,217, entitled "Object-Aware Transitions", filed Sep. 8, 2008, which is herein incorporated by reference in its entirety for all purposes.

BACKGROUND

1. Technical Field

The present invention relates generally to transitioning between sequential screens.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

One use which has been found for computers has been to facilitate the communication of information to an audience. For example, it is not uncommon for various types of public speaking, (such as lectures, seminars, classroom discussions, keynote addresses, and so forth), to be accompanied by computer generated presentations that emphasize or illustrate points being made by the speaker. For example, such presentations may include music, sound effects, images, videos, text passages, numeric examples or spreadsheets, or audiovisual content that emphasizes points being made by the speaker.

Typically, these presentations are composed of "slides" that are sequentially presented in a specified order. Typically, to transition between slides, a first slide would be replaced by a second slide on the screen. In some circumstances, some form of animation might be performed on the slides as they move on and off. However, the slides themselves are generally static images. Due to the prevalence of such computer-generated and facilitated presentations, one challenge is to maintain the interest level generated by such presentations, i.e., to keep the audience interested in the material being presented on the screen.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for providing object-aware transitions between slides of a presentation. Such object-aware transitions may include identifying each object on the slides being transitioned in and out. The objects or object-types may then be individually manipulated as part of the transition, such as by application of various effects, That is, the transition process may account for and independently animate or otherwise transition each of the objects or object-types composing the different slides.

In some instances, such object awareness can be leveraged as part of the transition. For example, in one embodiment, the same object, such as a graphic, word, number, or characters in a word or number, may be present in the outgoing and incoming slides. In one such example, the transition may take advantage of the presence of the common objects in the outgoing and incoming slides to provide an effect or animations specifically for those objects present in both slides. In this way, the presence of the object in both slides may be used to tailor the slide transition.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosure is generally directed to providing object-aware transitions between slides of a presentation. In particular, in accordance with the present disclosure, different objects within each slide are identified and can be separately and independently handled during slide transitions. In certain embodiments, this involves identifying objects present in both an outgoing and incoming slide and providing specific animation or handling for those objects. With this in mind, an example of a suitable device for use in accordance with the present disclosure is as follows.

Figure 1:
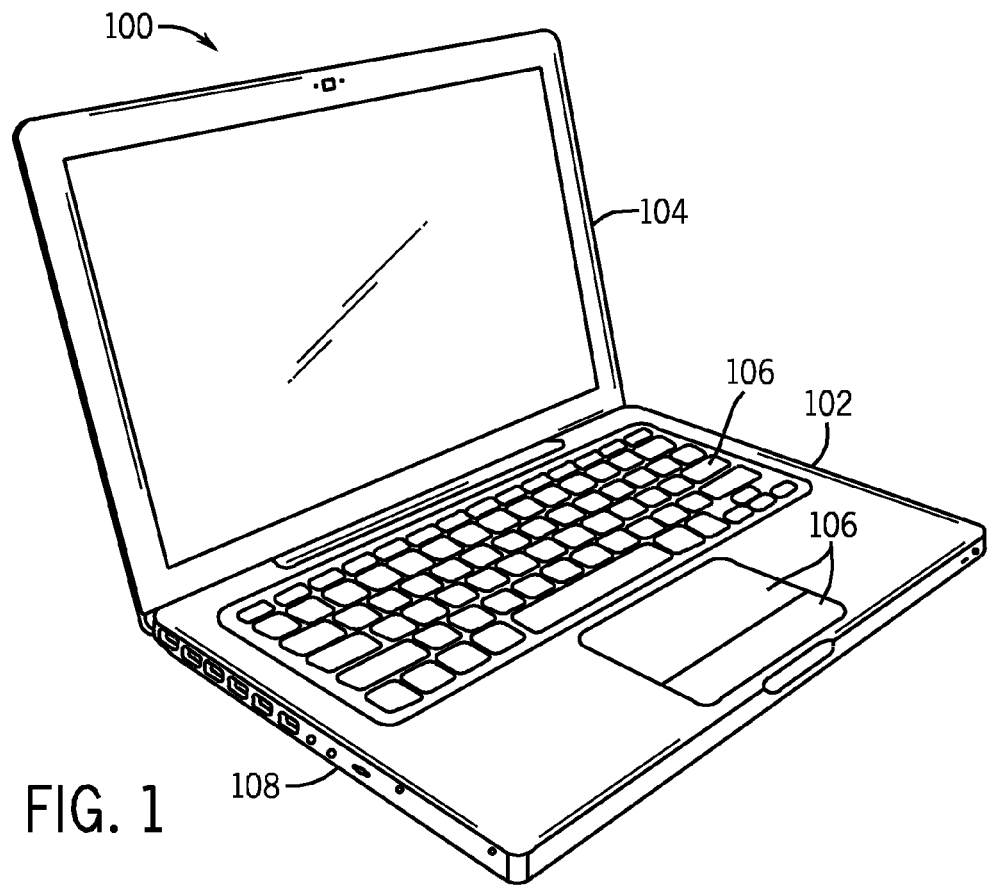
FIG. 1 is a perspective view illustrating an electronic device in accordance with one embodiment.

An exemplary electronic device 100 is illustrated in FIG. 1 in accordance with one embodiment of the present invention. In some embodiments, including the presently illustrated embodiment, the device 100 may be processor-based system, such as a laptop or desktop computer, suitable for preparing and/or displaying presentations, such as using the Keynote® software package available from Apple Inc as part of the iWork® productivity package. Other processor-based systems suitable for preparing and/or displaying presentations may include servers, thin-client workstations, portable or handheld devices capable of running presentation software, or the like. By way of example, the electronic device 100 may be a model of a MacBook®, MacBook® Pro, MacBook Air®, iMac®, Mac® mini, or Mac Pro® available from Apple Inc.

In the presently illustrated embodiment, the exemplary electronic device 100 includes an enclosure or housing 102, a display 104, input structures 106, and input/output connectors 108. The enclosure 102 may be formed from plastic, metal, composite materials, or other suitable materials, or any combination thereof. The enclosure 102 may protect the interior components of the electronic device 100 from physical damage, and may also shield the interior components from electromagnetic interference (EMI).

The display 104 may be a liquid crystal display (LCD), cathode ray tube (CRT) or other suitable display type. For example, in one embodiment, a suitable LCD display may be based on light emitting diodes (LED) or organic light emitting diodes (OLED). In one embodiment, one or more of the input structures 106 are configured to control the device 100 or applications running on the device 100. Embodiments of the portable electronic device 100 may include any number of input structures 106, including buttons, switches, a mouse, a control or touch pad, a keyboard, or any other suitable input structures. The input structures 106 may operate to control functions of the electronic device 100 and/or any interfaces or devices connected to or used by the electronic device 100. For example, the input structures 106 may allow a user to navigate a displayed user interface or application interface.

The exemplary device 100 may also include various input and output ports 108 to allow connection of additional devices. For example, the device 100 may include any number of input and/or output ports 108, such as headphone and headset jacks, video ports, universal serial bus (USB) ports, IEEE-1394 ports, Ethernet and modem ports, and AC and/or DC power connectors. Further, the electronic device 100 may use the input and output ports 108 to connect to and send or receive data with any other device, such as a modem, external display, projector, networked computers, printers, or the like. For example, in one embodiment, the electronic device 100 may connect to a scanner, digital camera or other device capable of generating digital images (such as an iPhone or other camera-equipped cellular telephone) via a USB connection to send and receive data files, such as image files.

Figure 2:
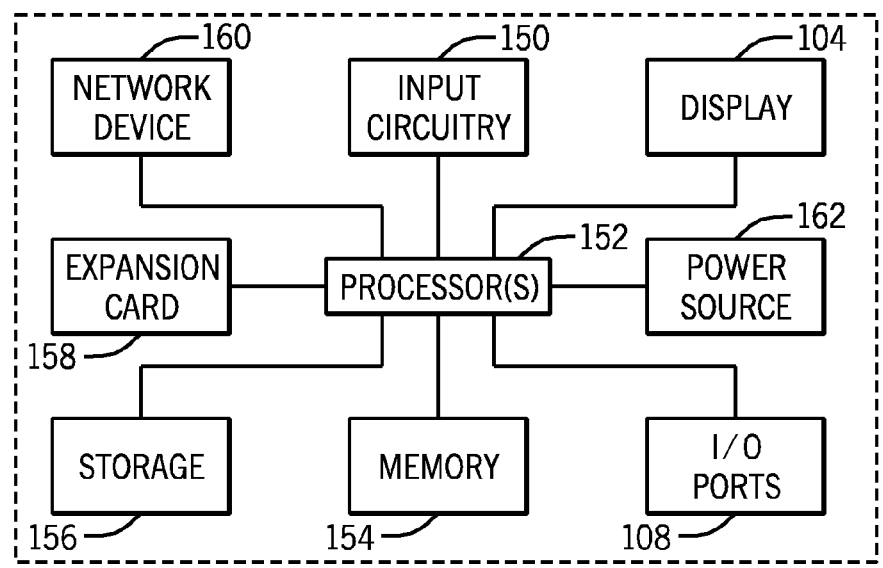
FIG. 2 is a simplified block diagram illustrating components of an electronic device in accordance with one embodiment.

The electronic device 100 includes various internal components which contribute to the function of the device 100. FIG. 2 is a block diagram illustrating the components that may be present in the electronic device 100 and which may allow the device 100 to function in accordance with the techniques discussed herein. Those of ordinary skill in the art will appreciate that the various functional blocks shown in FIG. 2 may comprise hardware elements (including circuitry), software elements (including computer code stored on a machine-readable medium) or a combination of both hardware and software elements. It should further be noted that FIG. 2 is merely one example of a particular implementation and is merely intended to illustrate the types of components that may be present in a device 100 that allow the device 100 to function in accordance with the present techniques.

In the presently illustrated embodiment, the components may include the display 104 and the I/O ports 108 discussed above. In addition, as discussed in greater detail below, the components may include input circuitry 150, one or more processors 152, a memory device 154, a non-volatile storage 156, expansion card(s) 158, a networking device 160, and a power source 162.

The input circuitry 150 may include circuitry and/or electrical pathways by which user interactions with one or more input structures 106 are conveyed to the processor(s) 152. For example, user interaction with the input structures 106, such as to interact with a user or application interface displayed on the display 104, may generate electrical signals indicative of the user input. These input signals may be routed via the input circuitry 150, such as an input hub or bus, to the processor(s) 152 for further processing.

The processor(s) 152 may provide the processing capability to execute the operating system, programs, user and application interfaces, and any other functions of the electronic device 100. The processor(s) 152 may include one or more microprocessors, such as one or more "general-purpose" microprocessors, one or more special-purpose microprocessors and/or ASICS, or some combination thereof. For example, the processor 152 may include one or more instruction processors, as well as graphics processors, video processors, and/or related chip sets.

As noted above, the components may also include a memory 154. The memory 154 may include a volatile memory, such as random access memory (RAM), and/or a non-volatile memory, such as read-only memory (ROM). The memory 154 may store a variety of information and may be used for various purposes. For example, the memory 154 may store firmware for the electronic device 100 (such as a basic input/output instruction or operating system instructions), other programs that enable various functions of the electronic device 100, user interface functions, processor functions, and may be used for buffering or caching during operation of the electronic device 100.

The components may further include the non-volatile storage 156. The non-volatile storage 156 may include flash memory, a hard drive, or any other suitable optical, magnetic, or solid-state storage medium, or a combination thereof. The non-volatile storage 156 may be used to store data files such as media content (e.g., music, image, video, and/or presentation files), software (e.g., a presentation application for implementing the presently disclosed techniques on electronic device 100), wireless connection information (e.g., information that may enable the electronic device 100 to establish a wireless connection, such as a telephone or wireless network connection), and any other suitable data.

The embodiment illustrated in FIG. 2 may also include one or more card slots. The card slots may be configured to receive an expansion card 158 that may be used to add functionality to the electronic device 100, such as additional memory, I/O functionality, or networking capability. Such an expansion card 158 may connect to the device through any type of suitable connector, and may be accessed internally or external to the enclosure 102. For example, in one embodiment, the expansion card 158 may be a flash memory card, such as a SecureDigital (SD) card, mini- or microSD, CompactFlash card, Multimedia card (MMC), or the like.

The components depicted in FIG. 2 also include a network device 160, such as a network controller or a network interface card (NIC). In one embodiment, the network device 160 may be a wireless NIC providing wireless connectivity over any 802.11 standard or any other suitable wireless networking standard. The network device 160 may allow the electronic device 100 to communicate over a network, such as a Local Area Network (LAN), Wide Area Network (WAN), or the Internet. Further, the electronic device 100 may connect to and send or receive data with any device on the network, such as portable electronic devices, personal computers, printers, and so forth. Alternatively, in some embodiments, the electronic device 100 may not include a network device 160. In such an embodiment, a NIC may be added into card slot 158 to provide similar networking capability as described above.

Further, the components may also include a power source 162. In one embodiment, the power source 162 may be one or more batteries, such as a lithium-ion polymer battery. The battery may be user-removable or may be secured within the housing 102, and may be rechargeable. Additionally, the power source 162 may include AC power, such as provided by an electrical outlet, and the electronic device 100 may be connected to the power source 162 via a power adapter. This power adapter may also be used to recharge one or more batteries if present.

Figure 3:
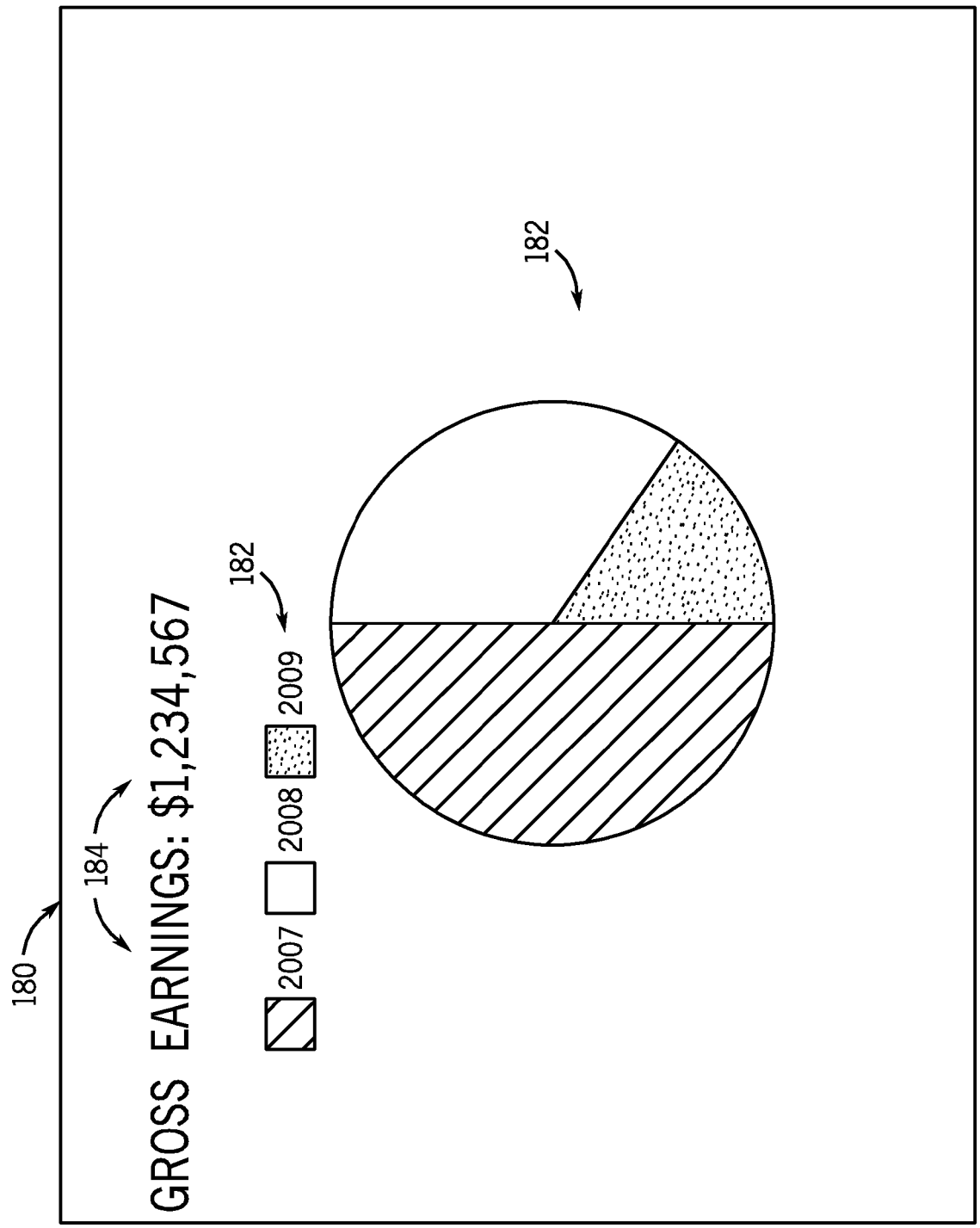
FIG. 3 depicts a slide including objects in accordance with one embodiment.

With the foregoing discussion in mind, various techniques and algorithms for implementing aspects of the present disclosure on such devices 100 and accompanying hardware and memory devices are discussed below. Turning to FIG. 3, a slide 180 having graphic objects 182 and character objects 184 (i.e., text and/or numbers or strings of text and/or numbers) is depicted. Such a slide is typically one part of a presentation that typically includes many slides that are sequentially displayed. For example, such a presentation (and the individual slides of the presentation) may be composed in an application (such as Keynote® available from Apple Inc.) suitable for generating and displaying presentations on processor-based system such as a computer. Such applications, or aspects of such applications, may be encoded using a suitable object-oriented programming language, such as Objective-C, C++, C#, and so forth.

The presentation application may provide multiple modes of operation, such as an edit mode and a presentation mode. In such an embodiment, when in the edit mode, the presentation application may provide a convenient and user-friendly interface for a user to add, edit, remove, or otherwise modify the slides of a slide show, such as by adding text, numeric, graphic, or video objects to a slide. To display a created slide or a sequence of slides in a format suitable for audience viewing, a presentation mode of the presentation application may be employed. In some embodiments, the presentation application may provide a full-screen presentation of the slides in the presentation mode, including any animations, transitions, or other properties defined for each object within the slides.

As used herein, a "slide" should be understood to refer to such a discrete unit of an ordered or sequential presentation. Such a slide, therefore, may be understood to function as a container for a set of objects (as discussed below) that together convey information about a concept. For example, a slide may contain or include different types of multimedia objects (e.g., text, numbers, images, videos, charts, graphs, and/or audio, and so forth) that explain or describe a concept to which the slide is directed and which may be handled or manipulated as a unit due to their being associated with or contained on the slide unit. Further, because a slide may contain multiple objects, a slide may have an associated z-ordering of those objects as they are displayed on the slide. That is, to the extent that objects on the slide may overlap or interact with one another, they may be ordered or layered with respect to a viewer such that some objects are on top of or beneath other objects as they appear on the slide. In this way, a slide may not only have a width and length associated with it, but also a depth.

The order or sequence of the slides in a presentation or slideshow is typically relevant in that the information on the slides (which may include both alphanumeric (text and numbers) and graphical components) is meant to be presented in order or sequence and may build upon itself, such that the information on later slides is understandable in the context of information provided on preceding slides. That is, there is a narrative or explanatory flow associated with the ordering or sequence of the slides. As a result, if presented out of order, the information on the slides may be unintelligible or may otherwise fail to properly convey the information contained in the presentation. This should be understood to be in contrast to more simplistic or earlier usages of the term "slide" and "slideshow" where what was typically shown was not a series of multimedia slides containing sequentially ordered content, but projected photos or images which could typically be displayed in any order without loss of information or content.

As used herein, the term "object" refers to any individually editable component on a slide of a presentation. That is, something that can be added to a slide and/or be altered or edited on the slide, such as to change its location, orientation, or size or to change its content, may be described as an object. For example, a graphic, such as an image, photo, line drawing, clip-art, chart, table, which may be provided on a slide, may constitute an object. Likewise, a character or string of characters may constitute an object. Likewise, an embedded video clip may also constitute an object that is a component of a slide. Therefore, in certain embodiments, characters and/or character strings (alphabetic, numeric, and/or symbolic), image files (.jpg, .bmp, .gif, .tif, .png, .cgm, .svg, .pdf, .wmf, and so forth), video files (.avi, .mov, .mp4, .mpg, .qt, .rm, .swf, .wmv, and so forth) and other multimedia files or other files in general may constitute "objects" as used herein. In certain graphics processing contexts, the term "object" may be used interchangeably with terms such as "bitmap" or texture".

Figure 4:
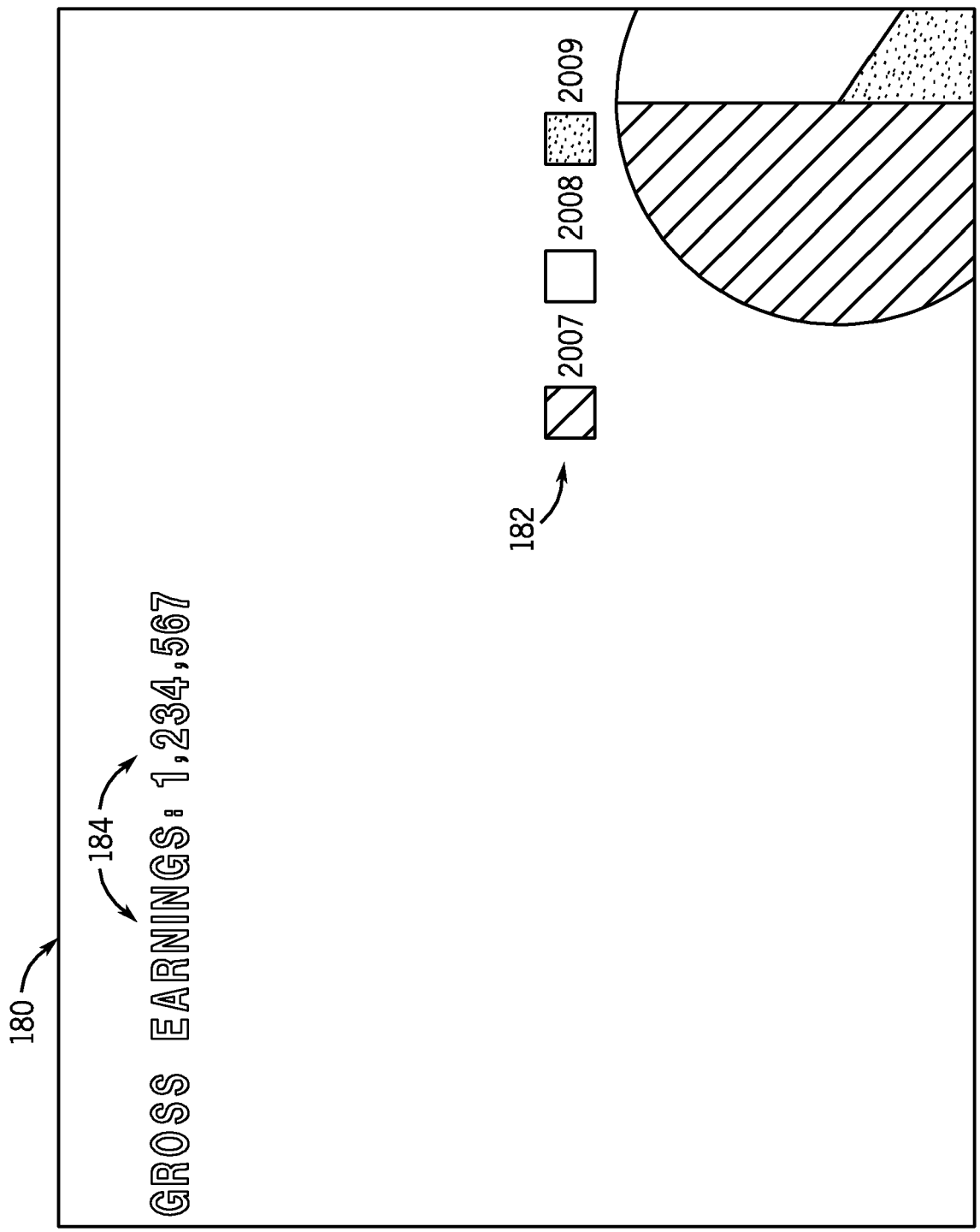
FIG. 4 depicts the slide of FIG. 3 undergoing a transition in accordance with one embodiment.
Figure 5:
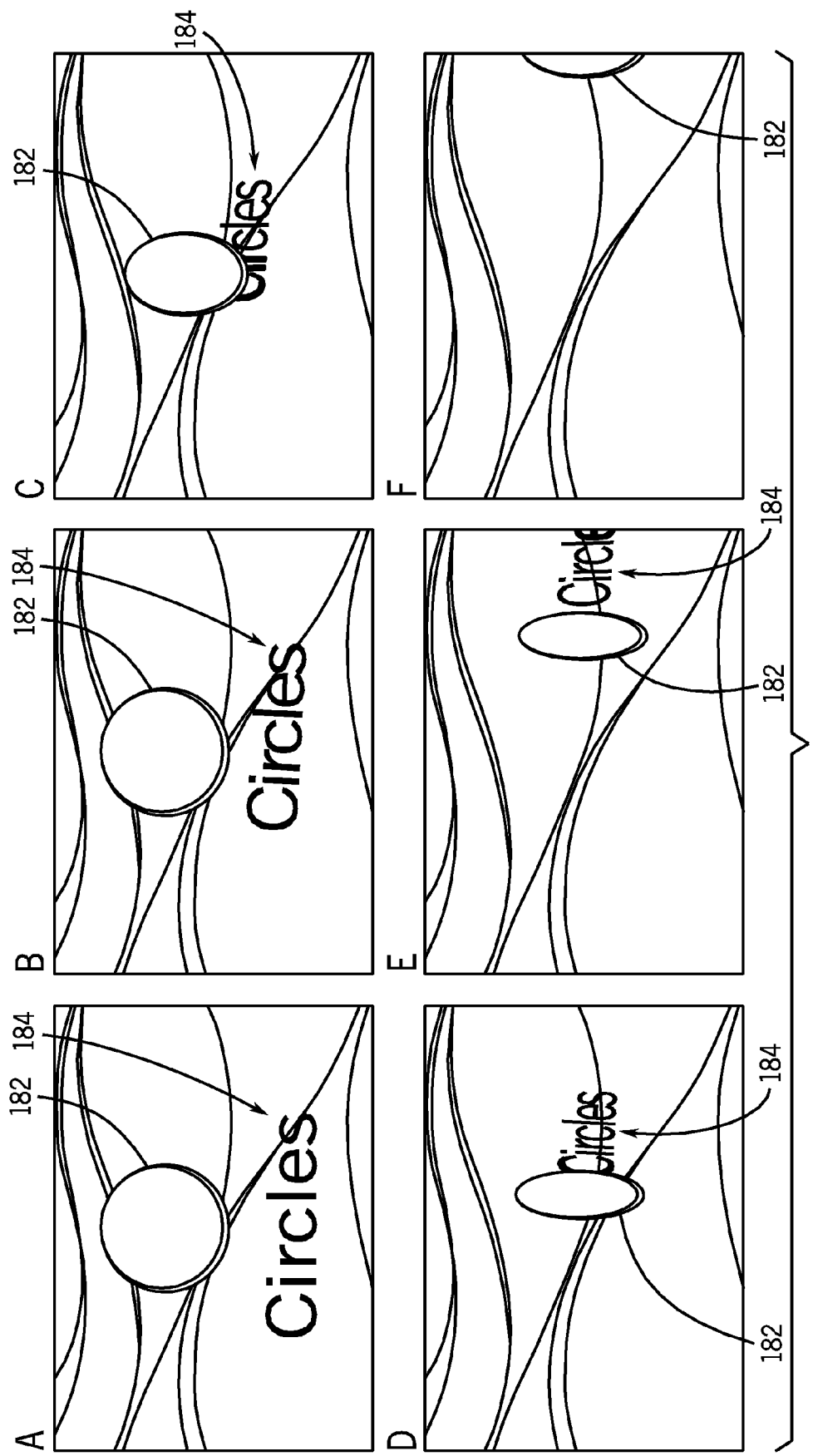
FIGS. 5A-5F depict screenshots of an object-aware slide transition in accordance with one embodiment.
Figure 6:
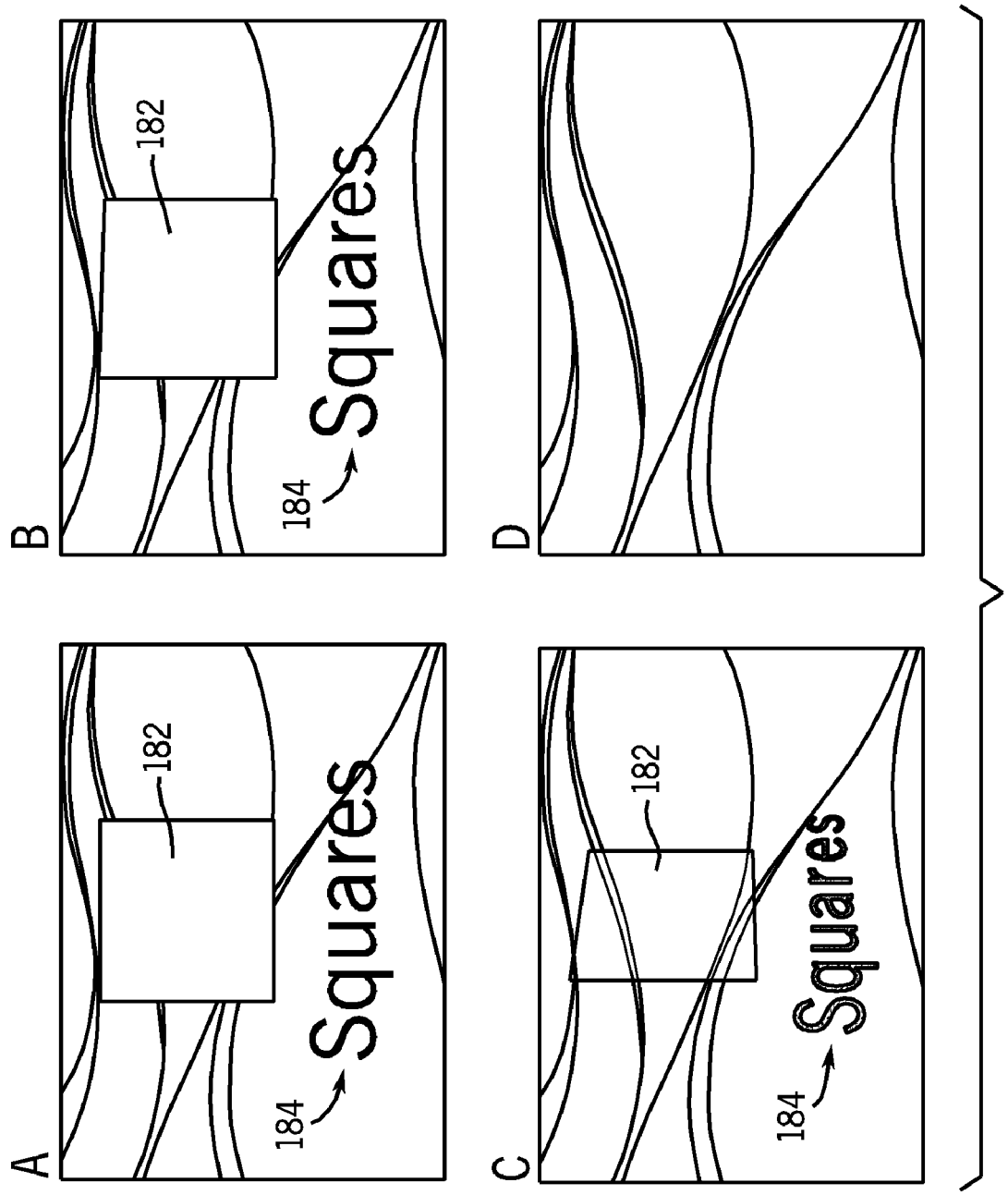
FIGS. 6A-6D depict screenshots of another object-aware slide transition in accordance with one embodiment.
Figure 7:
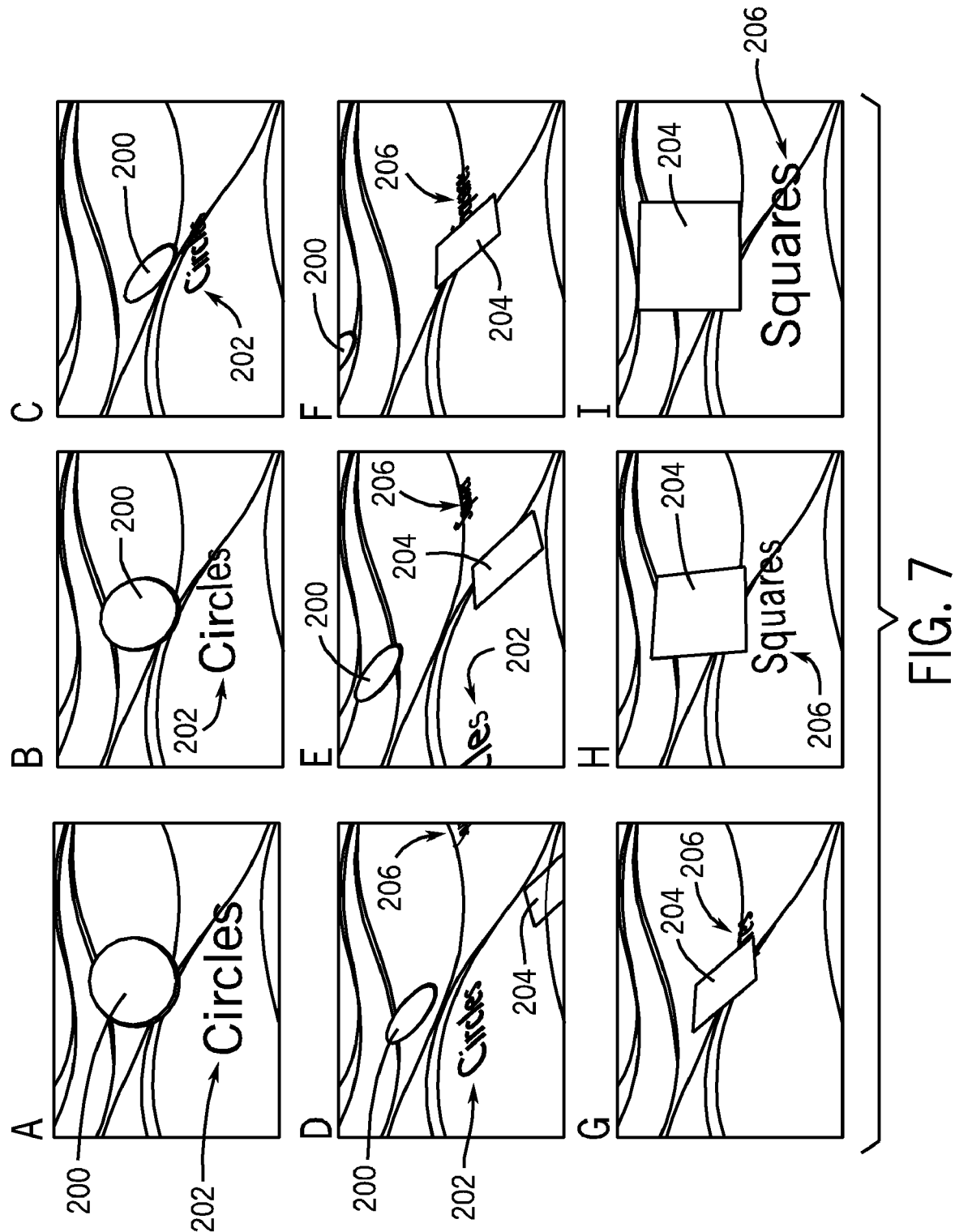
FIGS. 7A-7I depict screenshots of a further object-aware slide transition in accordance with one embodiment.
Figure 8:
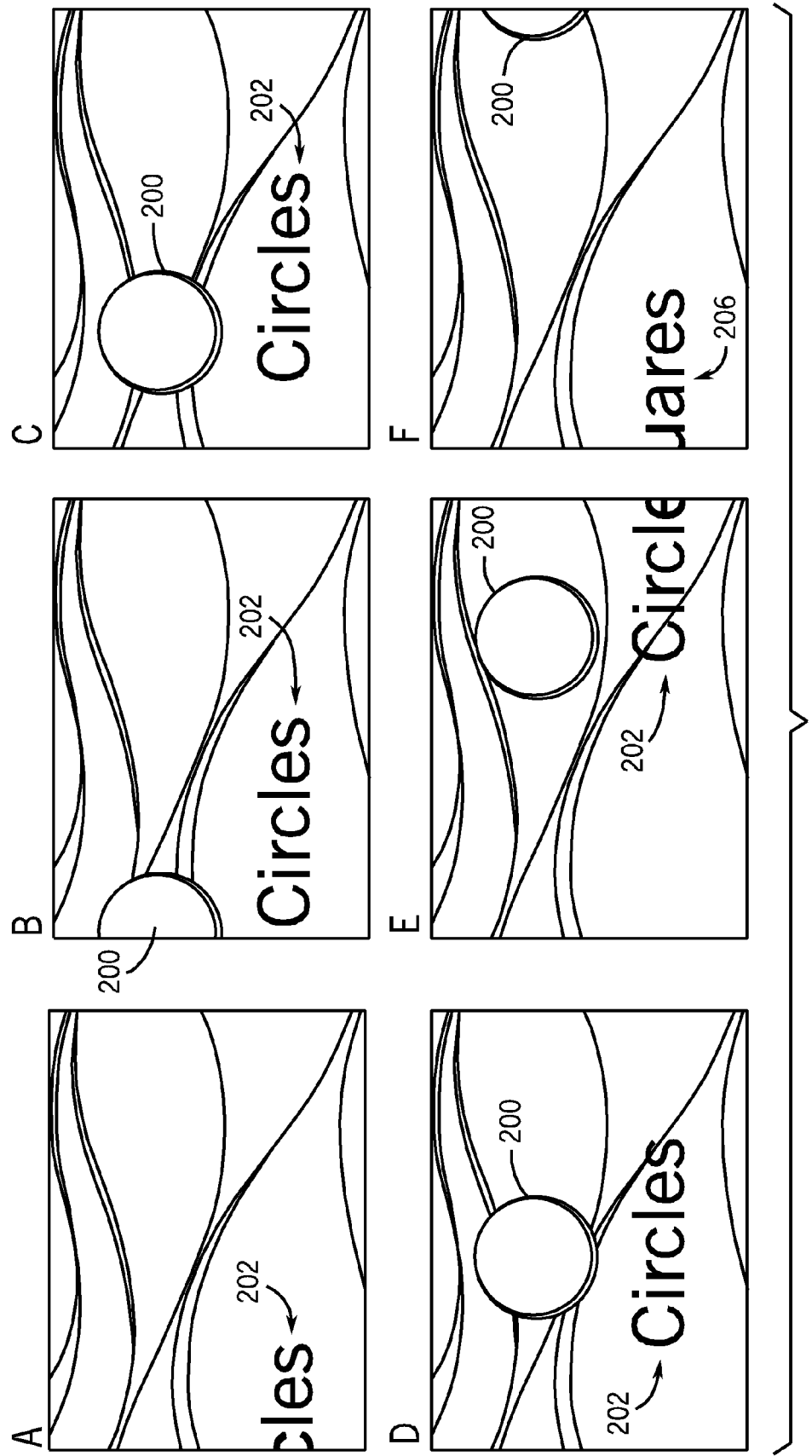
FIGS. 8A-8F depict screenshots of an additional object-aware slide transition in accordance with one embodiment.
Figure 9:
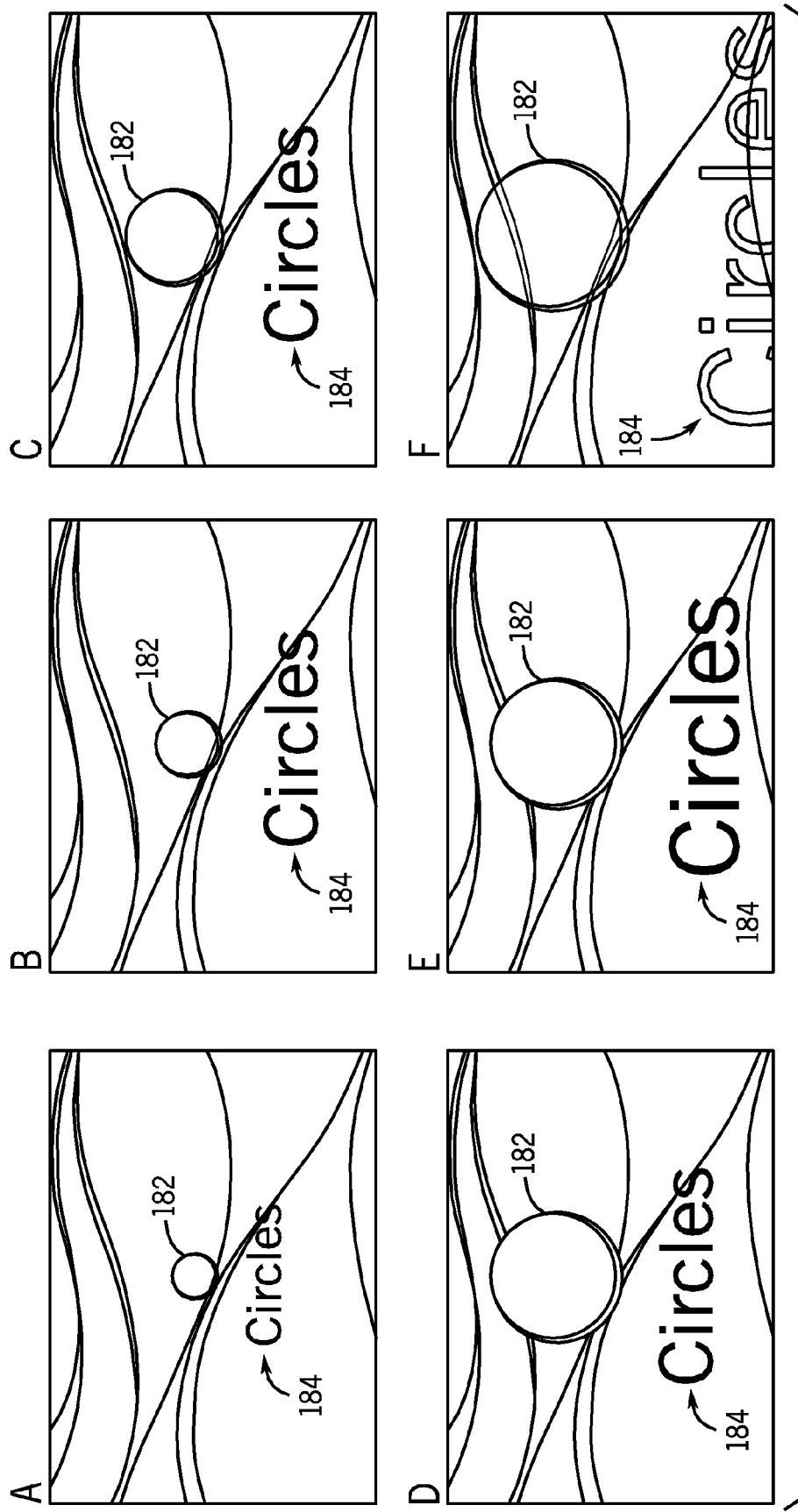
FIGS. 9A-9F depict screenshots of another object-aware slide transition in accordance with one embodiment.

In one embodiment, the objects provided on the slides of a presentation are identified, automatically or by a user, allowing each object to be independently manipulated, such an animated, when transitioning between slides. That is, for a slide being transitioned out, each object may be separately handled, so that different objects or types of objects may undergo a different effect as part of the transition. For example, turning to FIG. 4, text and numeric objects 184 on the slide may fade out as graphic objects 182 are animated off the edges of the slide. Likewise, objects or object types on the incoming slide may also be independently handled, such as by fading in text on the incoming slide and animating the entrance of images of the incoming slide from above or from the sides.

By identifying each object on a slide, effects for transitioning an object on or off the screen may be specified (automatically or by a user) for each object or each type of object (such as graphics files, text boxes, videos, etc.) independently of one another. The effect used in transitioning an object may depend on some characteristic of the object, such as a file type, location on the slide, color, shape, size, and so forth. For example, how close an object is to an edge may be a factor in determining whether the object will be animated on to or off of a slide and, if such an animation is selected, which edge the animation will occur relative to, how fast the animation will occur, and so forth. While the transition effects for different objects or object types may be handled automatically in one embodiment (such as based upon the factors described above), in other embodiments, a user may specify what effects are associated with the transition of an object on or off the screen. For example, a user may use a presentation application interface screen to specify properties of one or more objects on a slide, including transition effects for moving the object on or off the screen.

Such object or content, aware transitions differ from traditional approaches to transition between slides in which each slide is represented by a static image (and, therefore, treated as a single unit) and transitions would generally be an animation between the static images. However, individual objects on the slides were not individually manipulated, such as animated, during transitions. Thus, object-aware transitions, in the present context, are transitions that have access to the different individual objects of which the slides or slides are composed, and where each object can be animated or otherwise manipulated independent of the others.

In terms of the various effects that each object can be subjected to in such object-aware transitions, virtually any animation and/or manipulation that can be performed on the respective type of object may be suitable. By way of example, turning now to FIGS. 5A-5F, a sequence of screenshots depicting an example of an animated slide transition is depicted. In this example, the animation may be characterized as a "rotate and slide" animation in which a graphic object 182, here a circle, is "rotated" while "sliding" off of the right side of the slide from the center. Independent of the graphic object 182, a character object 184, here the text string "Circles", is also rotated and slid off the right of the slide. The character object 184, while rotating and sliding to the right of the slide, is also slid upward from beneath the circle to the vertical center of the slide while being animated off of the slide. Thus, the character object 184 and the graphic object 182 are animated independently of one another such that one object undergoes a different animation, i.e., vertical sliding, in the transition. It is also worth noting that the selected transition, such as "rotate and slide", may be used to animate in the objects of the next sequential slide. For example, in an incoming slide, a graphic object and character object may be rotated and slid in from the vertical center of the left side of the next slide, with one or both objects also undergoing an upward or downward animation to achieve the desired presentation location on the slide.

In practice, the identification of the graphic and character objects in the slide may be accomplished automatically, such as by an algorithm of a presentation application that identifies such objects by file type extensions or other indicators, or by user designation that the slide component is an object for purposes of object-aware transitions. Once the objects are identified and a transition effect, such as "rotate and slide", is selected for the slide by the user, the manner in which the selected effect is applied to each object in the slide may be determined automatically. For example, it may be automatically determined that all objects will rotate and slide off of the slide from the vertical center of the slide, and the animation of each object may be determined accordingly. Alternatively, in other embodiments, the user may be able to specify particular effects or animations for each object of the slide, or to specify the manner in which an effect is accomplished, such as with or without vertical centering for an individual object.

In another example, turning now to FIGS. 6A-6D, a sequence of screenshots depicting another animated slide transition is provided. In this example, the animation may be characterized as a "dissolve and flip" animation in which a graphic object 182, here a square, and a character object 184, here the text string "Squares", are rotated in place, i.e., flipped, while dissolving or fading from view, such as by progressively increasing the transparency of the objects. As in the previous example, the character object 184 and the graphic object 182 are animated independently of one another. As noted above, the "dissolve and flip" transition may also be used to animate the objects of the next sequential slide to introduce those objects, though obviously in such an implementation, the objects will not be dissolving but appearing or materializing, i.e., opacity will be gradually increased for the objects during the transition.

In yet another example, a sequence of screenshots depicting another animated slide transition is depicted in FIGS. 7A-7I. In this example, the animation may be characterized as an "isometric" animation in which, as depicted in FIGS. 7A-7F, a first graphic object 200, here a circle, and a first character object 202, here the text string "Circles", are subjected to an isometric transformation and moved off the top and left edges, respectively, of a slide. As in the previous example, the first character object 202 and the first graphic object 200 are animated independently of one another, of other objects in the slide, and/or of other objects in the next slide. In addition, the sequence of screenshots depicts, in FIGS. 7D-7I, the animation onto the screen of a second graphic object 204, here a square, and a second character object 206, here the text string "Squares". In the incoming transition of the second graphic object 204 and the second character object 206, these objects undergo the reverse isometric transformation and slide in from opposite respective sides of the screen as their first slide counterparts. As noted above, the "isometric" transition for the incoming slide may also be applied to each object of the incoming slide in an independent manner and/or without regard for the objects of the previous slide.

In a further example, a sequence of screenshots depicting another animated slide transition is depicted in FIGS. 8A-8F. In this example, the animation may be characterized as an "object push" animation in which, as depicted in FIGS. 8A-8D, a first graphic object 200, here a circle, and a first character object 202, here the text string "Circles", are "pushed" in from the left side of the slide. In the depicted example, the first graphic object 200 and the first character object 202 are pushed in at different speeds, e.g., the first graphic object 200 is lagging, though, at the end of the push in animation, the first graphic object 200 is aligned over the center of the first character object 202. Thus, the first character object 202 and the first graphic object 200 move independently of one another, of other objects in the slide, and/or of other objects in the next slide. In addition, the sequence of screenshots depicts, in FIGS. 8E-8F, the first graphic object 200 and the first character object 202 being pushed off the right side of the slide at different speeds, i.e., the graphic is lagging relative to the text, and a second character object 206 associated with the next slide is being pushed onto the slide from the left side. As with the previous slide, the "object push" transition for the incoming slide may also be applied to each object of the incoming slide in an independent manner (such as each object moving at a different speed or entering from a different direction) and/or without regard for the objects of the previous slide.

In another example, a sequence of screenshots depicting another animated slide transition is depicted in FIGS. 9A-9F. In this example, the animation may be characterized as an "object zoom" animation in which, as depicted in FIGS. 9A-9D, a graphic object 182, here a circle, and a character object 184, here the text string "Circles", arise out of the slide. In the depicted example, the graphic object 182 and the character object 184 rise up or appear at different times, i.e., the character object 184 is discernible first. Thus, the character object 184 and the graphic object 182 are animated independently of one another, of other objects in the slide, and/or of other objects in the next slide. In addition, the sequence of screenshots depicts, in FIGS. 9E-9F, the exiting transition of the graphic object 182 and the character object 184 from the slide. In this outgoing transition the graphic object 182 and the character object 184 rise off the surface of the slide until they disappear, with the character object 184 disappearing first. As with the previous slide, the "object zoom" transition for the outgoing objects may be applied to each object in an independent manner (such as each object moving, appearing, or disappearing at a different speed) and/or without regard for the objects of the next slide.

The preceding examples are illustrative of the manner in which individual objects on a slide may be differentially or independently manipulated, e.g., animated, without regard to other objects in a slide. The preceding examples, however, are not exhaustive, and it is to be understood that any animation or manipulation suitable for an object identified in a slide may be applied to that object without regard to the other objects in the slide or the objects in the previous or next slides in certain object-aware transition embodiments.

Further, as previously noted, the identification and assignment of animations may be largely automatic in some embodiments. For example, a user may design two or more sequential slides, such as by placing the desired objects on each slide in the desired locations. The user may then simply select a type of transition, such as the above-described isometric transition, for transitioning between two or more of the slides. In an automated implementation, the presentation application may, knowing only the selected transition and the type and location of the objects on the slides, assign suitable animation direction, speeds, effects, translucencies, and other animation effects to each object being transitioned in and out.

The preceding discussion describes implementations in which the transitions between slides do not take into account what the objects are that are in the slides or whether the same object is present in both the outgoing and incoming slide. However, in certain embodiments, the object-aware transition may take such object persistence into account. For example, in certain implementations where the same object, be it a text, numeric, graphic, and/or video object, is present in consecutive slides, an animation or manipulation may be applied to the object while maintaining the object on the screen. Thus, in one implementation, an object may be present in consecutive slides (though it may be in different locations, orientations, or at a different scale in the two slides) and an animation may be applied to the object such that the object appears to move, turn, resize, and so forth to reach the appropriate size, location, and/or orientation in the second slide after the transition.

As in the previously described embodiments, the identification of the object may be performed automatically or based on user inputs. In addition, the determination that the object is present in consecutive slides, though perhaps with different size or location properties, may be performed automatically. For example, the object may be a .jpg or a .gif image which is referenced by a common file name or location (such as an image gallery or library) when placed on the first and second slides or may be a text or numeric object that contains the same characters. Thus, an automated routine may determine that the same image file or character string (word, phrase, sentence, paragraph, and so forth) is present in both slides, even if it is at different locations in the slides or at different sizes. The presentation application may then also evaluate different attributes of the common object, such as size, position, color, rotation, font, and so forth, to determine if any of these attributes that differ between slides would preclude animation from one to the other. If however, the differences are susceptible to a transitional animation, the presentation application may automatically determine an animation for the transition between slides such that the common object appears to be moved, scaled, rotated, and so forth into the proper location for the incoming slide. Thus, in this embodiment, the user may do no more than design two sequential slides with one or more objects in common and the presentation application will identify the common objects on the sequential slides and provide appropriate animated transitions for the common objects when going from the first slide to the second.

Figure 10:
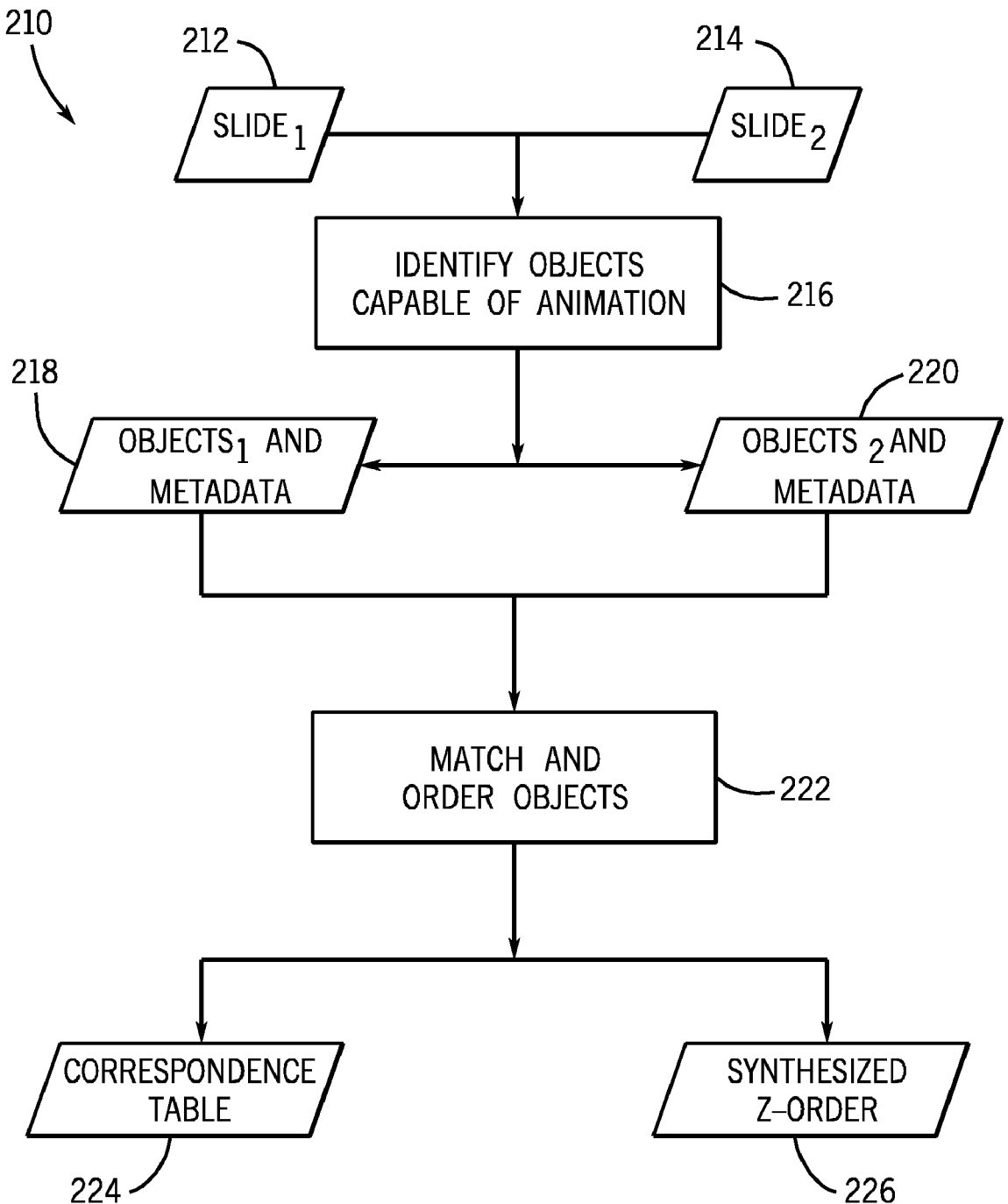
FIG. 10 is a flowchart depicting steps for identifying and matching objects on a pair of slides in accordance with one embodiment.

By way of example and turning now to FIG. 10, one example of a technique suitable for automatically identifying and matching objects on an outgoing and an incoming slide is provided. In FIG. 10 a flowchart 210 is provided depicting exemplary inputs, outputs, and processes that may be used in identifying and matching objects in a pair of slides.

In this example, a first slide 212 and a second slide 214 are provided to a routine capable of identifying (block 216) objects that can be animated and of acquiring information (e.g., metadata) associated with each identified object. For example, the identification process may be based on file name extensions, presence of text or characters, and so forth. In some embodiments, identified objects may also be generally characterized or classified based on the identifying feature (such as an image, shape, table, chart, movie, character string, etc.) to facilitate subsequent processing. In addition, as noted above, information or metadata for each identified object may also be determined. Such information or metadata may include, but is not limited to: a filename, a path describing a custom shape (such as a square, circle, star, and so forth), text attributes (such as automatic capitalization style, font metric information, or the character string itself), shadows and/or reflections applied to the object, masks or alpha masks applied to the object, rotation and/or scaling applied to the object, and so forth.

The objects and associated metadata 218, 220 identified for the respective first and second slides 212, 214 may be used to match and order (block 222) the objects such that objects present in both the first slide 212 and the second slide 214 are identified. For example, the objects identified in the first slide 212 and the second slide 214 may be compared in a pairwise process such that each object is matched with a corresponding object in the other slide or is determined to be present in only the first slide or the second slide (i.e., is unmatched). Based on the matching process, a correspondence table 224 may be generated specifying which objects in the first slide 212 correspond to which objects in the second slide 214.

In certain embodiments, different degrees of matching may be accommodated in the correspondence table 224. For example, an object may be determined to be present in both the first slide 212 and the second slide 214 in an identical form or with only changes in location, rotation, scale, and/or opacity. Such a match may be considered a "hard" or "solid" match in view of the certainty that the object is the same, i.e., is matched, or in view of the relative ease by which the object can be transformed from its form in the first slide 212 to its form in the second slide 214. Further, some metadata may indicate a clear identity match, such as where two image filenames are the same or where two text strings are identical and have the same style and metric information.

In other instances, a match may be construed to be a "soft" match where there is less certainty as to the match and/or where the transformation of the object between the first slide 212 and the second slide 214 is not simply a matter of moving, scaling, rotating or adjusting the opacity of the object. For example, an object in the first slide 212 and an object in the second slide 214 may have generally the same shape but may have different shadow styles, reflection styles, and/or fill styles. Such objects may be deemed to be a soft match in that they may represent the same object in the first and second slides 212, 214 but with some difference or differences that are not resolvable simply by moving, scaling, rotating, and/or changing the opacity of the object.

In addition to establishing the correspondence between objects in the first and second slides 212, 214, the matching and ordering step (block 222) may also establish an ordering 226 of the identified objects in the Z-dimension of the slides, i.e., in the depth dimension with respect to the slides. For example, different effect layers which can be viewed as overlying or underlying a slide may be viewed as being different layers in the Z-dimension. Such a synthesized Z-ordering 226 may be generated using the relative Z-positions of each object on the first slide 212 and/or second slide 214 such that the synthesized Z-ordering 226 provides a transitional or bridge Z-ordering between the two slides that may be used in a transition animation of the matched objects.

Figure 11:
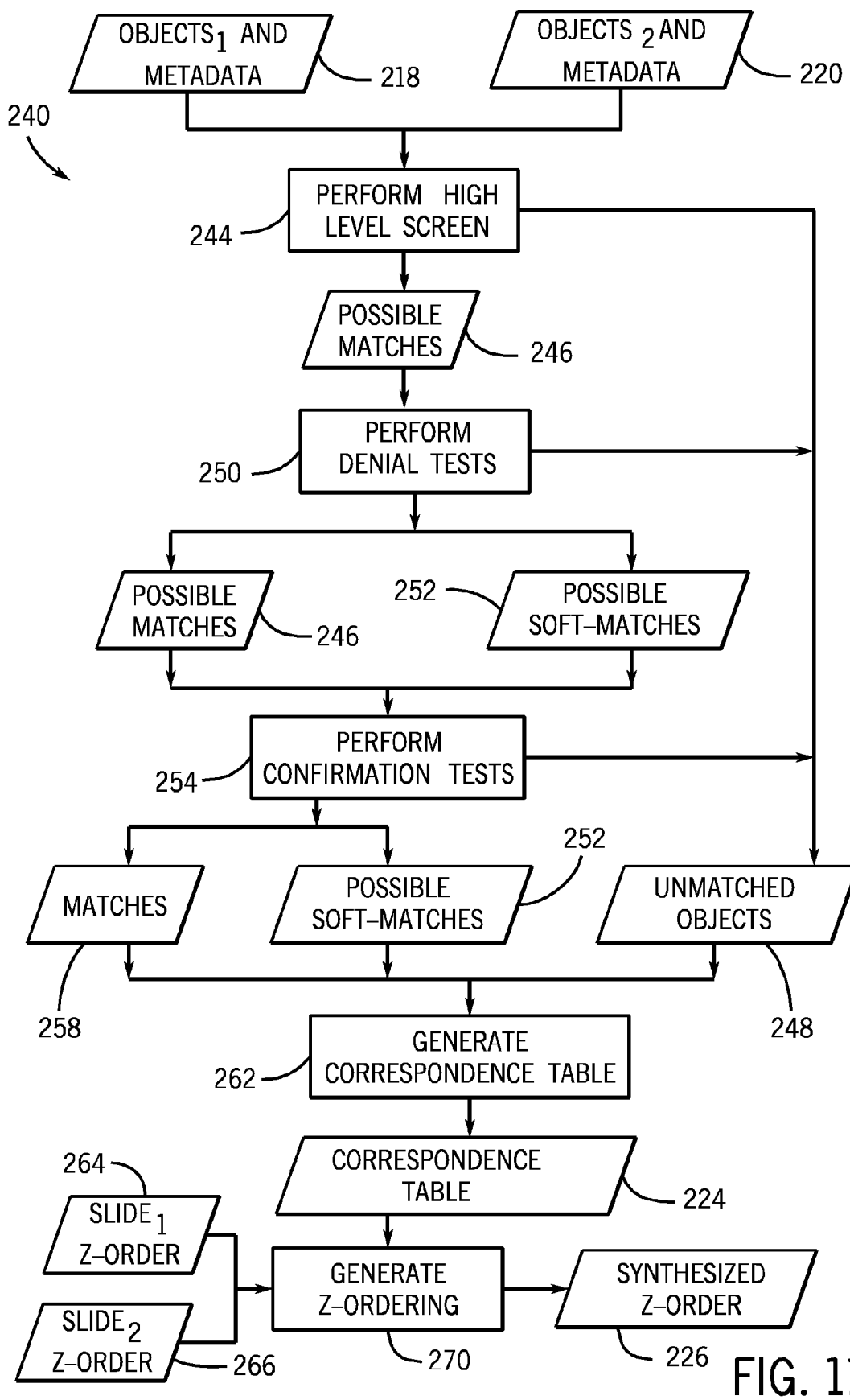
FIG. 11 is a flowchart depicting additional steps for identifying and matching objects in slides in accordance with one embodiment.

Turning now to FIG. 11, one example of a specific implementation of such a matching and ordering process is provided. In the flowchart 240 of FIG. 11, the identified objects and associated metadata 218, 220 for the first and second slides 212, 214 (FIG. 10) may be derived as previously discussed. Both sets of objects 218, 220 may be initially subjected to a high level screen (block 244) based on respective metadata characterizing the different object types (e.g., images, shapes, tables, charts, movies, character strings, and so forth). If an object on one slide can be characterized (based on filename extension or some other suitable metadata) as being a type of object which is not represented on the other slide, the object may be characterized as an unmatched object 248 without further analysis. For example, an object present on the first slide 212 may be characterized as a movie based on a filename extension (e.g., .mov, .avi, .mpg, and so forth). If no object on the second slide 214 is characterized as a movie, no additional analysis is needed to determine that the movie object on the first slide cannot be matched with an object on the second slide since there is no movie on the second slide.

However, if the high level screen (block 244) determines that objects on both the first and second slide 212, 214 may potentially be matches 246 due to the objects being the same type, the objects in question may be characterized as possible matches 246. The possible matches 246 may be subjected to additional analysis to determine if object matches are present in both outgoing and incoming slides. For example, in the depicted embodiment, the possible matches 246 may be subjected (block 250) to denial testing to determine whether objects found in the first and second slide 212, 214 are different from one another.

In one embodiment, such denial testing may be implemented in a pairwise manner, i.e., each object 218 of a given type on the first slide 212 may be compared in a pairwise manner with each object 220 of the same type on the second slide 214. For example, each image object on the first slide 212 may be compared with each image object on the second slide 214 to check for differences between each pair of image objects. Examples of differences which may be checked for include, but are not limited to, differences in the aspect ratios of the objects, different masks associated with the objects, different or dissimilar filenames, and so forth. If an object is determined to be different from every object of the same type in the other slide, the object may be characterized as an unmatched object 248. If an object cannot be unequivocally characterized as different from every object of the same type on the other slide, the object maybe characterized as a possible match 246.

In some embodiments, such as the depicted embodiment, the denial tests (block 250) may merely throw a match in doubt, without ruling a match out. For example, an object on the first slide and an object on the second slide may have different shadow styles, reflection styles, fill styles, and so forth, but may be otherwise similar. Such possible matches may be characterized as "soft" matches 252 in that the objects clearly have some degree of dissimilarity, but not sufficient dissimilarity to state with certainty that the objects are not identical except for some visual distinction, such as shadow, reflection, fill, border thickness, and so forth.

The possible matches 246 and possible soft matches 252 may be further subjected to a confirmation test (block 254) to determine whether objects found in the first and second slide 212, 214 are identical to one another. For example, a confirmation test may verify that text strings found in the first slide 212 and the second slide 214 are identical to one another and/or may verify that the font metric and style information are the same. Likewise, in confirmation testing image objects or movie objects, the confirmation test may confirm that the objects being compared share the same source file (such as by comparing file name and file location). Shape objects may be confirmation tested to confirm that the shape objects have the same border path, and so forth. Group objects may be confirmation tested to confirm that they share the same sub-objects and aspect ratio, and so forth. Failure of a confirmation test may result in an object being classified as an unmatched object 248. A successful confirmation of two objects in different slides may result in those objects being deemed matches 258. In some embodiments, a confirmation test may also deem two objects as a soft match where unequivocal confirmation is not available.

In one embodiment, when an object in the first slide 212 and an object in the second slide 214 successfully pass both denial tests and confirmation tests, the pair of objects may be marked as a set or match 258 and both objects will be removed from further pairwise comparisons. Likewise, if a pair of objects is judged a soft match in either or both of the denial or confirmation test, the pair of objects may be marked as a possible soft match 252. In some embodiments, such soft matched objects may be removed from further comparison while in other embodiments soft matched objects may be subjected to further pairwise comparisons to determine if a full or hard match can be confirmed.

Based on whether an object in the first slide 212 or second slide 214 is classified as being a match with an object in the other slide or as being unmatched with an object in the other slide, a correspondence table 224 may be generated (block 262). Such a correspondence table 224 may, in one embodiment, list each object in the two slides along with an indication of whether or not a match was identified and, if a match was identified, what object in the other slide constitutes the match. Alternatively, the correspondence table may only list the matched objects, with objects not listed on the table being understood to have no match. In embodiments in which soft matches are identified, the correspondence table 224 may contain an additional field or descriptor to indicate that the match is soft, i.e., not exact or identical. Further, in some embodiments, a numeric or quantitative measure of the certainty of the match may be provided in lieu of, or in addition to, a qualitative (i.e., "hard" or "soft") assessment.

In the depicted example the correspondence table 224, along with the orders 264, 266 of objects in the first and second slides, may be used to generate (block 270) a synthesized Z-order 226 of the objects in the two slides 212, 214. In one example, to establish the synthesized Z-order 226 of the identified objects, the Z-order 264 of the objects identified on the first slide (e.g., the outgoing slide) may be used to initially populate the synthesized Z-order 226. For each unmatched object on the outgoing slide (e.g., first slide 212) a determination may be made of which matched object occurs next in the outgoing slide's Z-order 264 and the respective unmatched object is inserted immediately before that matched object in the synthesized Z-order list 226. The incoming slide (e.g., second slide 214) may be handled similarly, but in reverse order, to maintain the correct relative Z-orders. Once completed, the synthesized Z-order 226 may provide a composite listing of the objects on both the outgoing and incoming slides (i.e., first slide 212 and second slide 214) with the appropriate "depth" or layer for each object on the slides for use in an animated transition between the slides.

Figure 12:
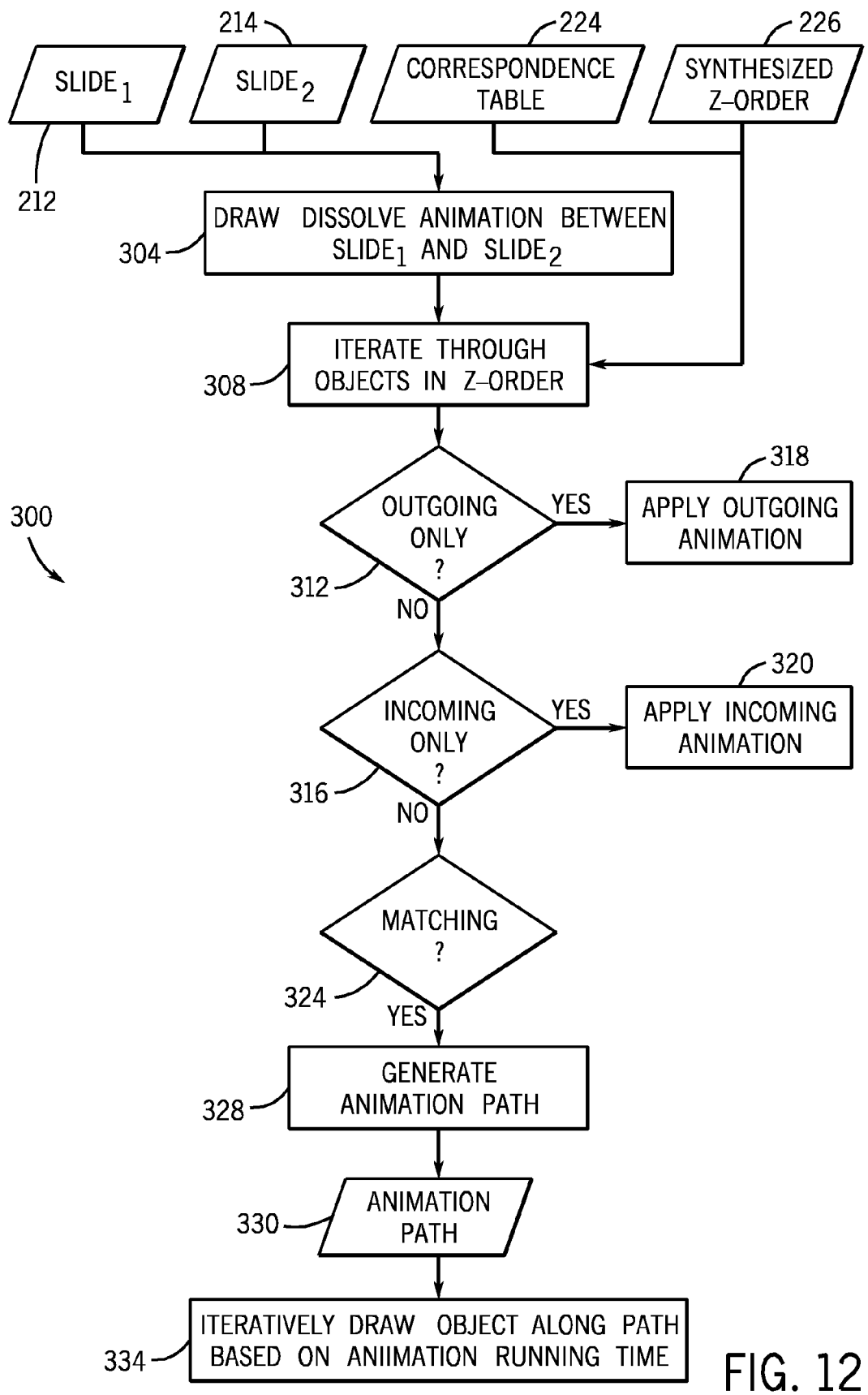
FIG. 12 is a flowchart depicting steps for animating objects during a slide transition in accordance with one embodiment.
Figure 13:
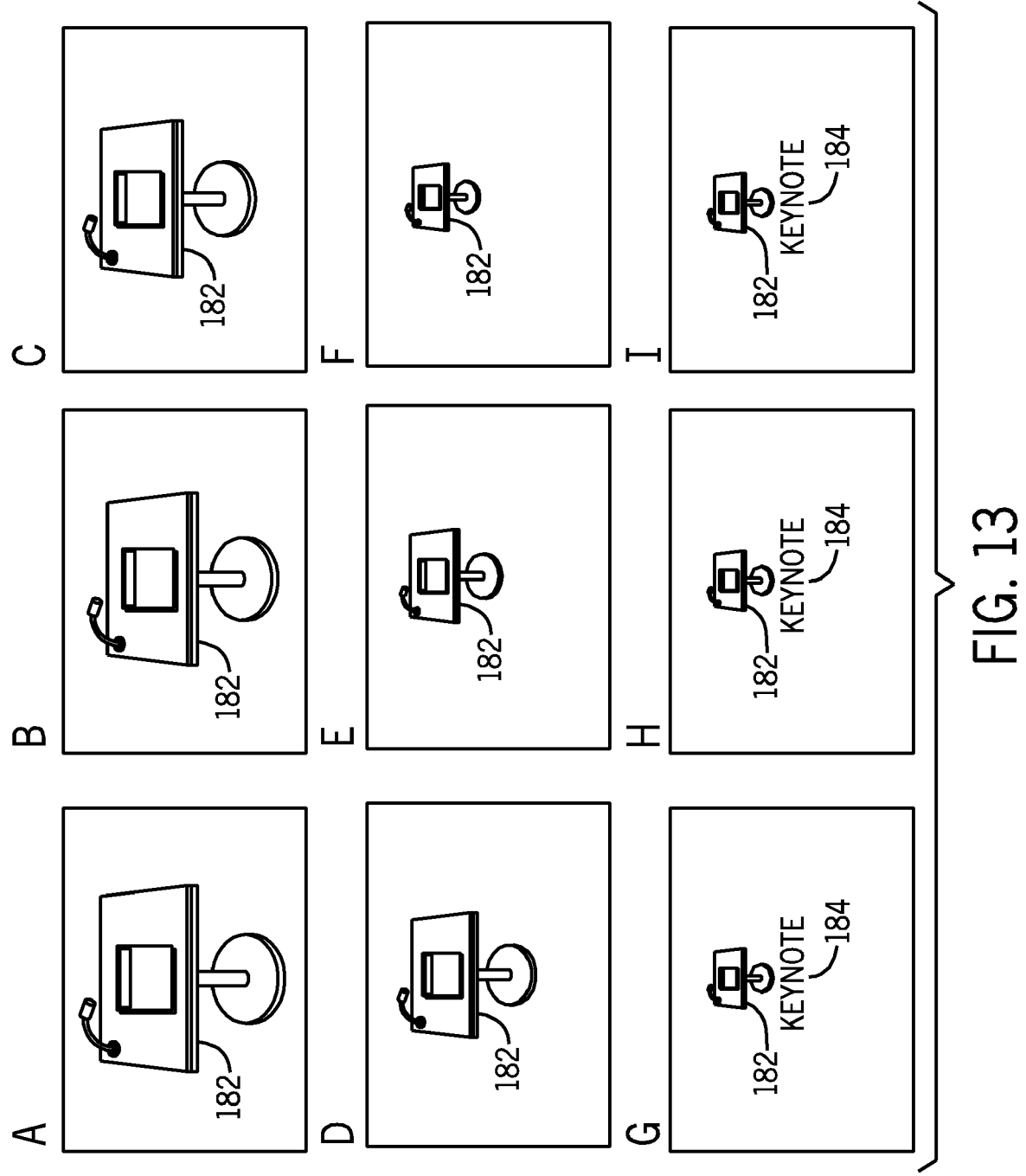
FIGS. 13A-13I depict screenshots of an object-aware slide transition with persistent objects in accordance with one embodiment of the present invention.
Figure 14:
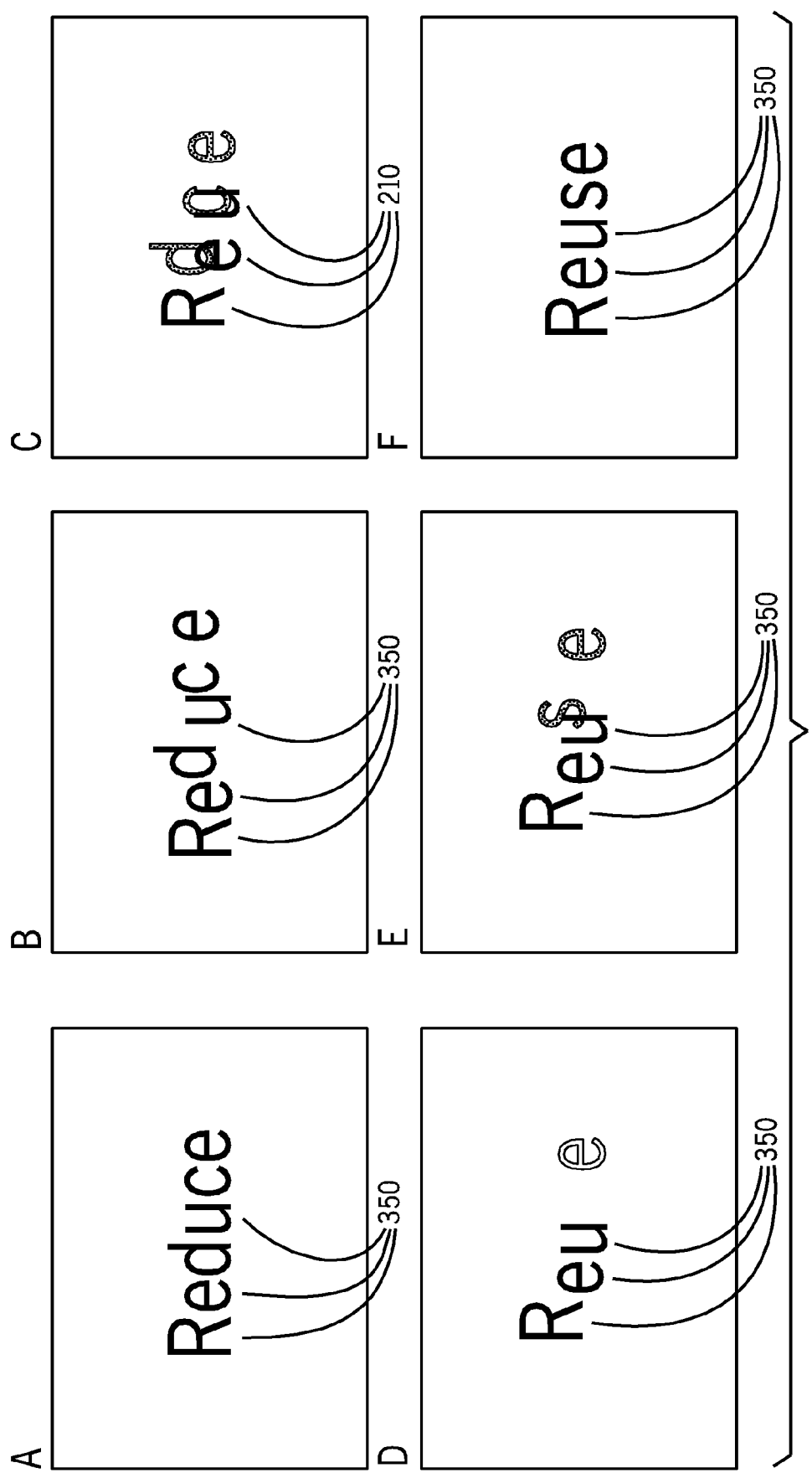
FIGS. 14A-14F depict screenshots of another object-aware slide transition with persistent objects in accordance with one embodiment of the present invention.

The correspondence table 224 and the synthesized Z-order may be used to generate a series of animation frames for transitioning from the first slide 212 to the second slide 214, as depicted by the flowchart 300 of FIG. 12. As part of one such transitional animation, a dissolve animation may be initially drawn (block 304) between the first slide 212 and the second slide 214. For example, the background of the first slide 212 may be dissolved, i.e., decreased in opacity, while the background of the second slide 214 is materialized, i.e., increased in opacity in the foreground.

In the depicted example, each object on the first slide 212 and the second slide 214 may be iteratively processed (block 308) based on the order specified in the synthesized Z-order 226. As part of the iterative processing, each object may be checked against the correspondence table 224 to determine if it is only on the outgoing slide (e.g., first slide 212), only on the incoming slide (e.g., second slide 214), or on both the outgoing and incoming slides.

If an object is determined (block 312) to be present on only the outgoing slide or is determined (block 316) to be present on only the incoming slide, a specified outgoing animation 318 or incoming animation 320 may be performed on the object. For example, if an object is determined to be only on the outgoing slide, the object may undergo a dissolve animation or an animation moving the object off the screen that occurs over all or part of a specified transition interval. For instance, in one embodiment an object present only on the outgoing slide may have its opacity increased from 0% to 100% over the entire transition interval. Conversely, an object present only in the incoming slide may undergo a materialize animation or an animation moving the object onto the screen over all or part of the specified transition interval. For example, an object present only on the incoming slide may have its opacity decreased from 100% to 0% over the entire transition interval.

In the depicted embodiment, if an object is determined (block 324) to be present in both the outgoing and incoming slides, an animation path 330 is generated (block 328) to transition the object from an initial position on the outgoing slide and a final position on the incoming slide. Information (e.g., metadata) about the object on each slide may be used in generating the animation path 330 to determine if the object has different scaling, rotation, and/or opacity on the two slides. If such differences are determined to exist for the object on the two slides, the animation path 330 may include scaling, rotating, and/or changing the opacity of the object from how it appears on the first slide 212 to how it appears on the second slide 214 such that a smooth transition of the object is perceived.

To animate the transition of the object between the first and second slides 212, 214 the object may be iteratively drawn (block 334), i.e., animated, at appropriate positions along the animation path based on the elapsed time of the transition interval. For example, if the specified transition interval is 1 second and the animation is to occur at 60 frames per second, the object will be drawn 60 times during the 1 second transition, with each drawing of the object corresponding to a respective position on the animation path 330. That is, in this example, the first drawing of the object along the animation path 330 will occur at $t_1 = \frac{1}{60}$th of a second into the transition and will correspond to the object as it appears at a point or step $\frac{1}{60}$ of the way along the animation path 330. Likewise, halfway through the transition animation, the object will be drawn at $t_{30} = \frac{1}{2}$ of a second into the transition and will correspond to the object as it appears at the halfway point of the animation path 330.

In certain embodiments, the designation of an object match as being a soft match may affect the transition animation. For example, an object present in both the first slide 212 and the second slide 214 may be characterized as a soft match due to having certain dissimilarities in the respective slides that are not sufficient to characterize the objects as unmatched (such as borders of different thickness on two otherwise identical shapes or different filler, shadow, or reflection effects applied to otherwise identical shapes). In one such embodiment, the animation path 330 may include a fade out of the object as it appears on the first slide and a fade in of the object as it appears on the second slide to smoothly fade in the dissimilar features. In such embodiments, shaders or shader functionality provided by a graphics processor or chipset may be used to generate weighted or intermediate images on the animation path 330 that correspond to transitional images of the object as it appears in the first and second slide 212, 214. In this manner, the dissimilarities between the object on the first and second slides 212, 214 may be smoothly faded out or in over the course of the transition animation.

In certain embodiments, the animation of unmatched objects may be handled differently if matched objects are present than when no matched objects are present. For example, in one embodiment, if no matched objects are present on the first slide 212 and the second slide 214, the respective objects may be faded out and faded in over the full transition interval. That is, in such an embodiment, the objects on the outgoing slide may be faded out (i.e., opacity increasing from 0% to 100%) over the full length of the transition interval, such as 2 seconds, while the incoming objects may be materialized (i.e., opacity decreasing from 100% to 0%) over same interval. However, in the presence of one or more matched objects on the first and second slides 212, 214, the animation of the unmatched objects may be altered, such as accelerated. For example, in the presence of one or more matched objects being animated along an animation path 330 during a slide transition, the unmatched objects may be undergo an accelerated, i.e., shorter, fade in or fade out animation. For instance, in such an example an unmatched object being faded out in the presence of matched objects may be faded out by the halfway point of the transition or less, such as by the time 25%, 30%, or 33% of the transition interval has elapsed. Similarly, an unmatched object being faded in in the presence of matched objects may not begin fading in until the halfway point of the transition interval has been reached or later, such as by the time 66%, 70%, or 75% of the transition interval has elapsed.

With the foregoing discussion in mind, certain examples of such object-aware transitions are provided where one or more objects are present in both the outgoing and the incoming slide. For example, turning now to FIGS. 13A-13I, a sequence of screenshots depicting a slide transition is depicted. In this example, a graphic object 182, here a stand, is present in both the outgoing and incoming slides. However, the graphic image 182 is at a different size and location in the first slide relative to the second slide. In addition, a character object 184, here the text string "Keynote", is introduced in the second slide which is not present in the first slide. In the depicted example, the graphic object 182 is animated to appear to shrink and to move upward on the screen as part of the transition between slides. In addition, the character object 184 is added during the transition. As in previous embodiments, the graphic object 182 and character object 184 may be animated or manipulated independently of one another.

In another embodiment of an object-aware transition that takes into account the persistence of objects between slides, a character-based example is provided. In this example, the actual characters, be they letters, numbers, punctuation, etc., on a slide may be evaluated separately for persistence between slides. That is, the characters within a text and/or numeric string may be considered to be the objects in the present context. In an automated implementation, when evaluating the character objects to determine if the character object is present in consecutive slides, the presentation application may evaluate different attributes of the character, such as the letter or number itself, the font, the font size, the color, the presence of certain emphasis (highlight, underlining, italics, bold, strikethrough, and so forth) and other attributes that may affect the similarity of the perceived character in consecutive slides. In certain embodiments, the character might be identical across the evaluated attributes to be retained or animated between slides. In other embodiments, certain attributes, such as color changes, emphases, and so forth, may still allow animation and retention of the character between slides.

In this example, while the characters may be present in consecutive slides, they need no be used in the same words or numbers, and therefore need not remain in the same order. Turning to FIGS. 14A-14F, a sequence of screenshots depicting a slide transition is depicted. In this example, the character string "Reduce" is initially displayed though, after the slide transition, the character "Reuse" will be displayed. Thus, the persistent character objects 350 "R", "e", and "u" are present in both the first and second slide, though there is an intervening "d" in one slide but not the other.

In the depicted example, the non-persistent characters are slid away and faded from view as part of the transition while the persistent character objects 350 remain in view and are slid into their new positions consistent with the word displayed on the second slide. As in previous embodiments, the character objects 350 may be animated or manipulated independently of one another. As will be appreciated, the present example depicts letters, however the characters may also be numbers, symbols, punctuation and so forth. In addition, though the present example described sliding and fading (or retaining) of the characters, in other embodiments other types of character animation may be employed. For example, instead of sliding on the screen, the transition animation may instead rotate or flip the word about a vertical or horizontal axis, with the changes to the word being accomplished during the rotation or flip of the word. Indeed, any suitable form of character animation may be employed in manipulating characters in such an embodiment. Further to the extent that a character or character string may be present multiple times on either or both of the outgoing and incoming slide, in certain embodiments matching processes, such as those described with respect to FIGS. 10 and 11, may take into account the distance between characters or character strings in assigning matches. For example, if multiple possible matches are present for a character string found on the first slide 212 and the second slide 214, one factor in assigning a match may be the distance between the possible matches, with one implementation assigning matches which provide the shortest path moves.

As will be appreciated, the present techniques allow for identification of objects on slides of a presentation and the independent manipulation, such as animation, of the objects during slide transitions. As described herein, in some embodiments, no weight is given as to whether the same object or objects are present in consecutive slides. However, in other embodiments, the presence of an object or objects in consecutive slides may be noted and manipulation of the objects during slide transition may take advantage of the persistence of the objects. In certain embodiments, as described herein, the identification of objects and/or the transitional manipulation of the identified objects may be automatically derived, such as by a presentation application executing on a processor-based system.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for animating persistent objects on consecutive slides of a computer-implemented slide show presentation, comprising:

providing a first computer-executable routine to a processor or to a memory utilized by the processor, wherein the first computer-executable routine, when executed by the processor, identifies one or more objects on an outgoing slide and one or more objects on an incoming slide, wherein the objects are distinct and separable from the respective slide and wherein each slide constitutes a receptacle for the addition and presentation of the respective objects;

providing a second computer-executable routine to a processor or to a memory utilized by the processor, wherein the second computer-executable routine, when executed by the processor, compares the one or more objects on the outgoing slide and the one or more objects on the incoming slide;

providing a third computer-executable routine to a processor or to a memory utilized by the processor, wherein the third computer-executable routine, when executed by the processor, classifies each object as being present on the incoming slide and the outgoing slide or as being present on only one of the incoming slide or the outgoing slide utilizing a correspondence table generated based on the comparison, wherein the correspondence table lists each object in the outgoing slide and the incoming slide and provides an indication of whether or not a match was identified for each object; and providing a fourth computer-executable routine to a processor or to a memory utilized by the processor, wherein the fourth computer-executable routine, when executed by the processor, generates an animation for each object based on the respective classification of the object, wherein the animation is different for objects classified as being present on the incoming slide and the outgoing slide than for objects classified as being present on only one of the incoming slide or the outgoing slide.

2. The method of claim 1, comprising providing a fifth computer-executable routine to a processor or to a memory utilized by the processor, wherein the fifth computer-executable routine, when executed by the processor, determines metadata for each identified object.

3. The method of claim 2, wherein the metadata comprises one or more of a filename, a shape, one or more text attributes, a text string, a shadow applied to the respective object, a reflection applied to the respective object, a mask applied to the respective object, an indication of rotation, an indication of scaling, or an explicit indication that a respective object in the outgoing slide corresponds to a respective object in the incoming slide.

4. The method of claim 1, wherein the objects can be added to, edited on, positioned on, or removed from the respective slide.

5. The method of claim 1, wherein each slide is generated using a presentation application by which the one or more objects are added to and positioned on the respective slides.

6. The method of claim 2, wherein comparing the one or more objects comprises comparing the metadata associated with each object.

7. The method of claim 1, wherein objects provided on each slide are layered such that the respective objects have a corresponding z-order.

8. The method of claim 1, wherein each object constitutes discrete content added to the respective slide.

9. The method of claim 1, wherein the animation for a respective object classified as being present on the incoming slide and the outgoing slide comprises one or more of a change in position, in scale, in rotation, or in opacity due to differences in the position, rotation, scale, or opacity of the respective object in the outgoing slide and in the incoming slide.

10. A method for animating transitions between slides of a computer-implemented slide show presentation, comprising:
providing a first routine to a processor or to a memory utilized by the processor, wherein the first routine, when executed by the processor, automatically determines whether an object is present on both a first slide and on a second slide using a correspondence table generated at least in part based on information associated with the object, wherein the object, if present, comprises content presented on the slide that is distinct and separable from the respective slide and wherein the correspondence table lists each object on the first slide and on the second slide and provides an indication of whether or not a match was identified for each object;

providing a second routine to a processor or to a memory utilized by the processor, wherein the second routine, when executed by the processor, generates an animation path for the object if the object is present on both the first slide and the second slide, wherein the animation path animates a transition of the object from the first slide to the second slide such that the object is animated differently if it is present on both the first and second slide than if it is present on only one of the first or second slide; and providing a third routine to a processor or to a memory utilized by the processor, wherein the third routine, when executed by the processor, renders the object along the animation path when transitioning from the first slide to the second slide.

11. The method of claim 10, wherein the animation path comprises one or more of moving, rotating, resizing, or changing the opacity of the object to resolve differences between the object as presented on the first slide and as presented on the second slide.

12. The method of claim 10, wherein the object can be added to, moved on, edited on, or removed from the respective first or second slide without otherwise altering the respective slide.

13. The method of claim 10, wherein rendering the object comprises iteratively drawing the object along the animation path based on a projected animation run time.

14. The method of claim 10, wherein the first slide and the second slide comprise receptacles for receiving and presenting the object.

15. Computer-readable media comprising a computer program product, the computer program product comprising routines which, when executed on a processor, perform the following:
matching an object present on a first slide with the object, if present, on a second slide of a multi-slide presentation, wherein the object is distinct and separable from the respective slides, wherein the respective slides constitute receptacles for receiving and presenting such objects, and wherein the matches are determined using a correspondence table that lists each object in the first slide and the second slide and that provides an indication of whether or not a match was identified for each object;

generating an animation path for transitioning the object from how the object appears on the first slide to how the object appears on the second slide such that the object is animated differently if it is present on both the first and second slide than if it is present on only one of the first or second slide; and animating the object along the animation path when the first slide transitions to the second slide during the multi-slide presentation.

16. The computer-readable media of claim 15, wherein the object has a respective z-ordering on each slide on which the object is present.

17. The computer-readable media of claim 15, wherein matching the object is performed by a pairwise comparison of all objects identified on the first slide with all objects identified on the second slide.

18. The computer-readable media of claim 15, wherein animating the object along the animation path comprises rendering the object in step-wise increments determined based upon a transition time, a refresh rate, and the animation path.

* * * * *

UNITED STATES PATENT AND TRADEMARK OFFICE
CERTIFICATE OF CORRECTION

PATENT NO.         : 7,721,209 B2                                               Page 1 of 1
APPLICATION NO.    : 12/422808
DATED              : May 18, 2010
INVENTOR(S)        : James Eric Tilton It is certified that error appears in the above-identified patent and that said Letters Patent is hereby corrected as shown below:

In column 15, line 10, after "faded in" delete "in".

In column 15, line 54, delete "no" and insert -- not --, therefor.

Signed and Sealed this
Eighth Day of November, 2011

David J. Kappos
*Director of the United States Patent and Trademark Office*